United States Patent [19]
Purinton et al.

[11] 3,990,065
[45] Nov. 2, 1976

[54] THEFT DETECTION SYSTEM

[75] Inventors: Edwin C. Purinton, Oreland; Carl S. Holzinger, Coopersbury; Robert Auger, Lansdale, all of Pa.

[73] Assignee: The Magnavox Company, Fort Wayne, Ind.

[22] Filed: Feb. 20, 1975

[21] Appl. No.: 551,582

[52] U.S. Cl. .............................. 340/280; 324/41; 340/258 R
[51] Int. Cl.² ........................................ G08B 13/24
[58] Field of Search ............ 340/280, 258 R, 258 C; 324/41

[56] References Cited
UNITED STATES PATENTS

| | | | |
|---|---|---|---|
| 3,707,711 | 12/1972 | Cole et al. | 340/280 |
| 3,747,086 | 7/1973 | Peterson | 340/280 |
| 3,765,007 | 10/1973 | Elder | 340/280 |
| 3,820,104 | 6/1974 | Fearon | 340/280 |
| 3,838,409 | 9/1974 | Minasy et al. | 340/280 |

FOREIGN PATENTS OR APPLICATIONS

| | | | |
|---|---|---|---|
| 763,681 | 5/1934 | France | 340/258 D |

*Primary Examiner*—David L. Trafton
*Attorney, Agent, or Firm*—Thomas A. Briody; Joe E. Barbee; William J. Streeter

[57] ABSTRACT

Apparatus and method for detecting the presence, in an inspection area, of a marker tag having preselected properties. Transfer of articles from a protected area can be monitored by coupling a marker tag with each article and by including an inspection area in all transfer paths. In a theft detection system, the coupled marker tag can be removed or made inoperative in some manner for authorized withdrawal of an article from the protected area.

The marker tag is comprised of a small, thin strip of magnetic material. A time-varying magnetic field is provided for interacting with a marker tag located in the inspection area. The magnetic field, which includes components having frequencies $f_1$ and $f_2$, has a time-dependent spatial orientation which permits interaction with a marker tag having an arbitrary orientation in the inspection area. The magnetic field components of frequency $f_2$ produce changes in the magnetic properties of the marker tag, resulting in the generation of a signal having components of frequencies $f_1 \pm 2f_2$.

When the magnitude and phase of the signal having the component $f_1 + 2f_2$ falls within a range of values of magnitude and phase peculiar to the marker tag, an alarm is activated by signal detection apparatus. The restricted nature of the signals producing an alarm effectively distinguishes a marker tag from signals produced by other objects in the inspection area.

12 Claims, 14 Drawing Figures

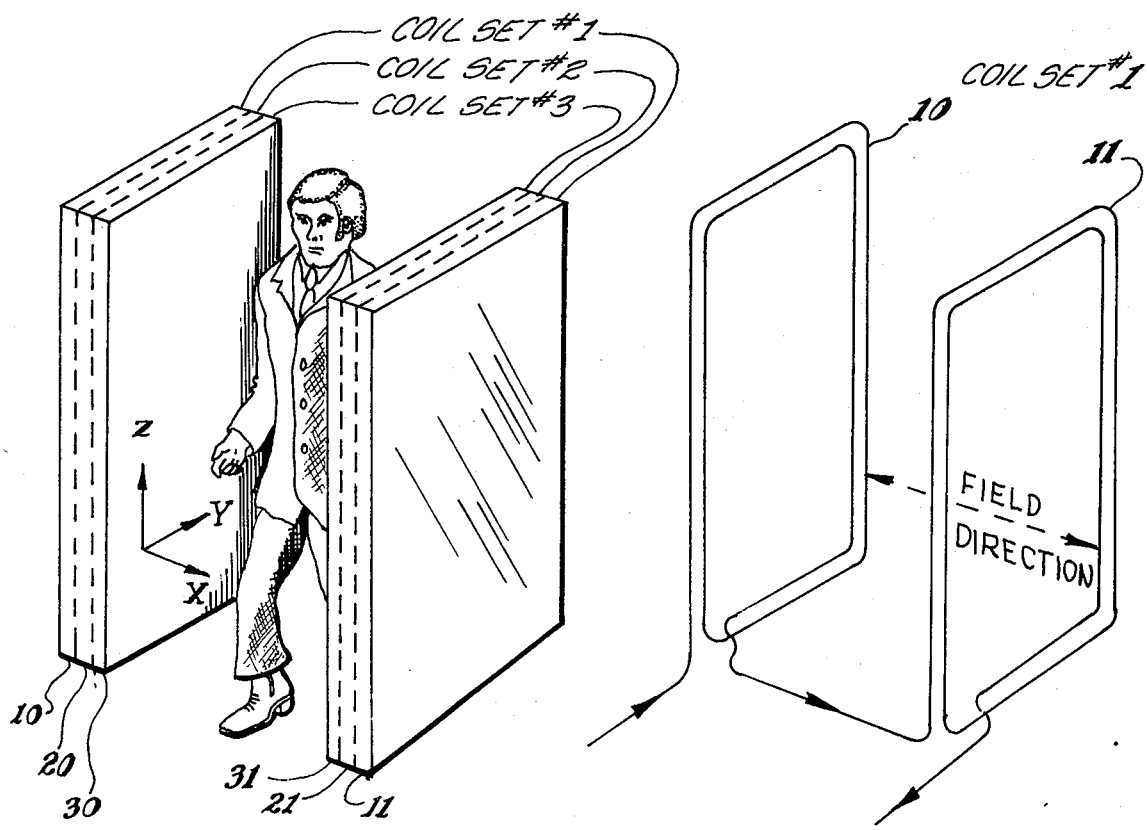
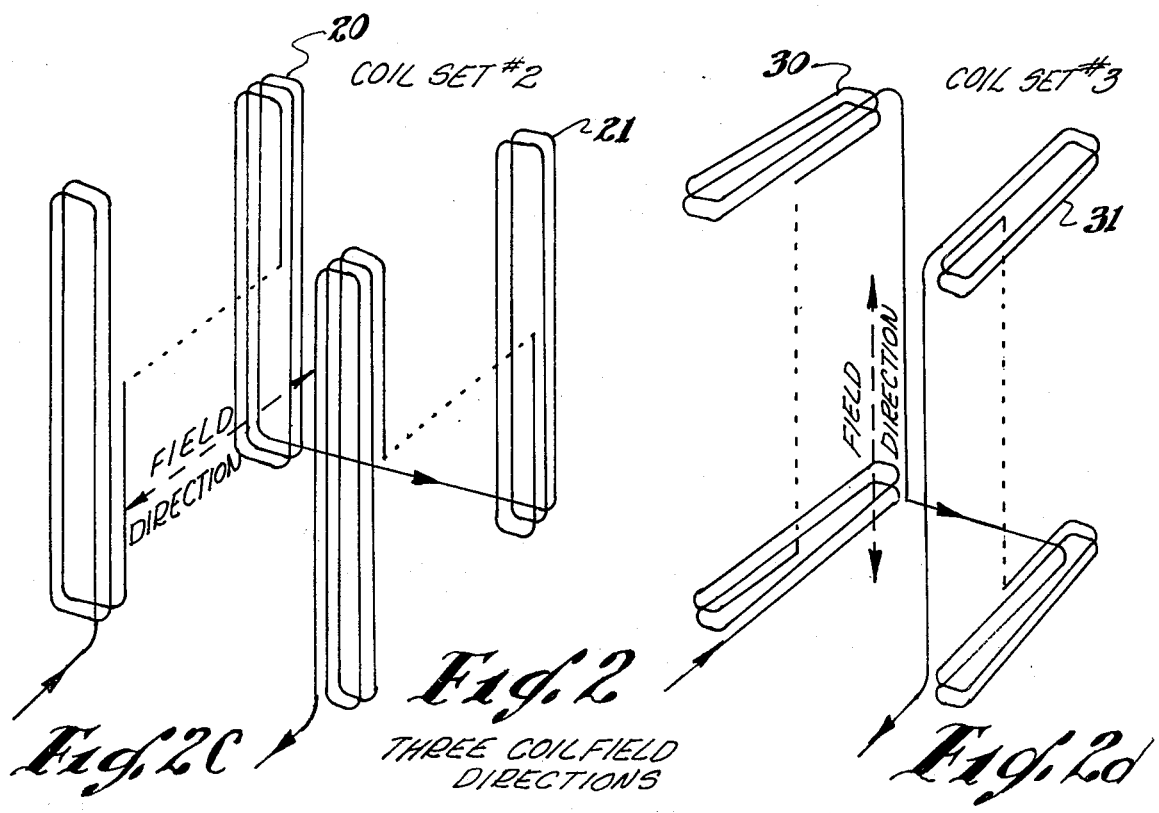

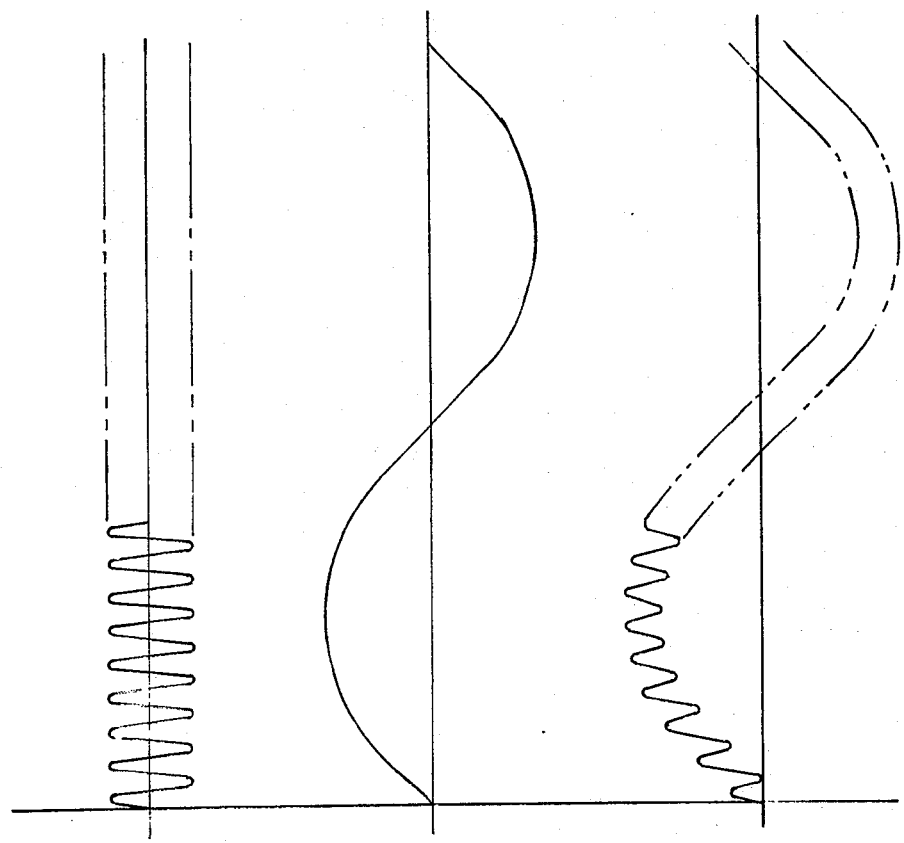

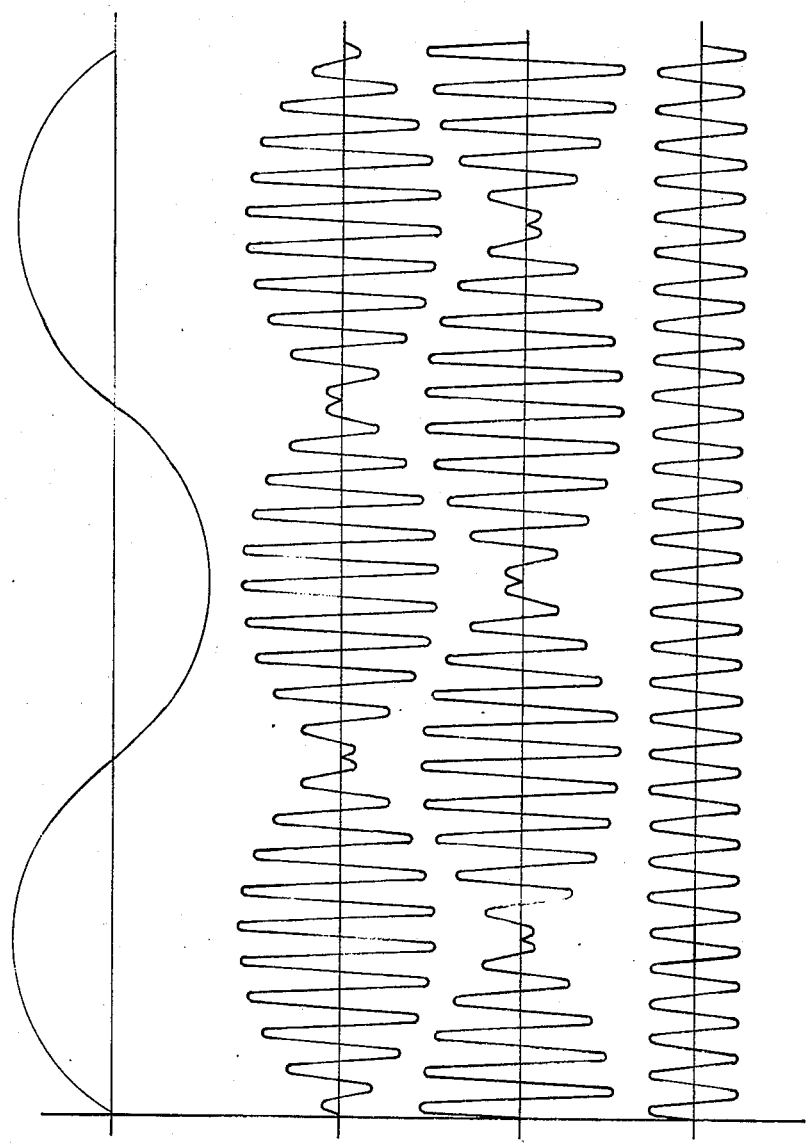

THEFT DETECTION SYSTEM

BACKGROUND OF THE INVENTION

1. Field of the Invention

This invention relates generally to systems for detection of objects having preselected properties and more particularly to the class of detection systems used for prevention of merchandise theft from a protected area. A marker tag is attached to an article of merchandise for which protection is sought. This marker tag can be rendered inoperative by an operator for a permitted removal of an article from the protected area. Apparatus, located at an exit station of the protected area, detects the passage of any marker tag which has not been rendered inoperative and therefore identifies an associated protected article of merchandise for which removal is unpermitted.

2. Description of the Prior Art

In the prior art, methods are known for providing detection apparatus responsive to the passage of a marker tag through a specified location. In typical operation, an article of merchandise over which control is sought in a protected area, has attached thereto a marker tag. Upon purchase, the marker tag is either rendered inoperative, removed from the article of merchandise, or routed in a manner to avoid the detection apparatus. A detection of a tag material typically indicates an unauthorized removal of the attached merchandise from the protected area.

There are, however, many problems associated with the prior attempts to control articles of merchandise using this type of system. One important problem is the ability to discriminate between the marker tag and the multiplicity of other objects which a person, with access to the protected area, might possess. Examples of the diversity range from carriages for infants to soda cans. This discrimination is particularly important to permit as much freedom of access as possible to a protected area while minimizing the compromise of goodwill associated with mistaken identification of another article as a marker tag.

A further problem with prior systems involves the existence of system "blind spots." "Blind spots" result when the detection apparatus is unable to detect the presence of a marker tag in certain regions of an exit station or certain orientations of the marker tag. The problem arises because the geometry of a tag material unavoidably enters into the detection process, and can also occur in some cases because a person's body is capable of shielding the tag from the interrogation fields used by certain systems.

Still another problem with prior systems involves "masking" in a system by the introduction of various metallic objects. These objects can be electrically conductive or can have magnetic properties, while certain materials can have both electrical and magnetic properties. These objects, although possibly not resulting in activation of the detection apparatus, can produce large field disturbances and associated burdens on the detection apparatus, such that the presence of a marker tag cannot be detected and is therefore masked.

A further problem with prior systems involves the size of the marker tags. In order to be inconspicuous when attached to an article of merchandise, it is desirable that the tag be physically as small as possible. This size requirement is in conflict with the need for the tag to produce a large effect to activate the detection apparatus.

It is therefore an object of the present invention to provide an improved theft detection system.

It is another object of the present invention to provide a theft detection system possessing the capability of disciminating between a marker tag and other materials producing detectable field perturbation effects.

It is still another object of the present invention to provide apparatus for minimizing the required dimensions of a marker tag.

It is a more particular object of the present invention to provide a marker tag containing magnetic material and apparatus for cycling the tag material through regions of differing permeability.

It is another particular object of the present invention to provide apparatus for electrically varying the spatial orientation of the field used in the detection of the magnetic marker tag.

It is yet another object of the present invention to subject a magnetic material to an applied magnetic field having two different frequency components, the marker tag producing a component with a new frequency not contained in the two applied fields or linear combinations thereof.

It is a more specific object of the present invention to detect the amplitude and phase of a new magnetic field component of a third frequency produced by the influence of the low loss magnetic marker tag material on the applied magnetic field.

It is an even more particular object of the present invention to detect a unique third frequency electromagnetic field component, generated by a marker tag in response to a spatially varying applied field, independent of the spatial orientation of a marker tag.

SUMMARY OF THE INVENTION

The aforementioned and other objects are accomplished, according to the present invention, by providing a theft detection system with a marker tag comprised of magnetic material, apparatus for applying biasing field and interrogation magnetic field components to the marker tag, and apparatus for detecting magnetic field components generated by the interaction of the originally applied fields with the marker tag.

The bias field component periodically cycles the tag material through regions of different magnetic properties. The interrogation field component, interacting with the periodically-varying properties of the marker tag, generates a field component having different frequencies, one of which can be identified by detection apparatus; thus, the tag material being nonlinear produces signals with frequencies like those produced by a modulator.

The production of the field component with a new frequency and the detection thereof by the detection apparatus is dependent upon the marker tag material and the given geometric configuration of the tag. To prevent ordinary items from initiating a system alarm, the tag is constructed of an easily magnetized material having a low loss hysteresis loop as compared to generally available materials.

To exclude the possibility of a marker tag being undetected because of an unfavorable spatial orientation, apparatus is provided for causing the spatial orientation of the applied fields to have a time dependent variation.

These and other features of the invention will be understood upon reading of the following description along with the drawings.

BRIEF DESCRIPTION OF THE DRAWINGS

FIG. 2 consists of FIGS. 2a, 2b, 2c, and 2d which are perspective views of a positioning of three sets of field generating coils to provide the electromagnetic fields according to the preferred embodiment.

FIG. 3 consists of FIGS. 3a–3g which show the typical waveforms of signals applied to the coils of FIG. 2, and the waveforms of the resulting magnetic fields.

FIG. 3a shows an interrogation signal having a frequency $f_1$.

FIG. 3b shows a bias signal having a frequency $f_2$.

FIG. 3c shows the signal resulting when the signals of FIGS. 3a and 3b are added.

FIG. 3d shows a modulating signal of frequency $f_3$ used to cause a rotation of the resultant field in the passageway.

FIG. 3e shows the signal of FIG. 3c, without the $f_1$ signal, amplitude modulated by the signal of FIG. 3d.

FIG. 3f shows the signal of FIG. 3c, without the $f_1$ signal, amplitude modulated by a signal at $f_3$, 90° phase shifted from the signal of FIG. 3d.

FIG. 3g shows the signal of FIG. 3c, without the $f_1$ signal, with the same time base as FIGS. 3d, 3e and 3f for clarity of illustration.

DESCRIPTION OF THE PREFERRED EMBODIMENT

Detailed Description of the Figures

Figure 1:
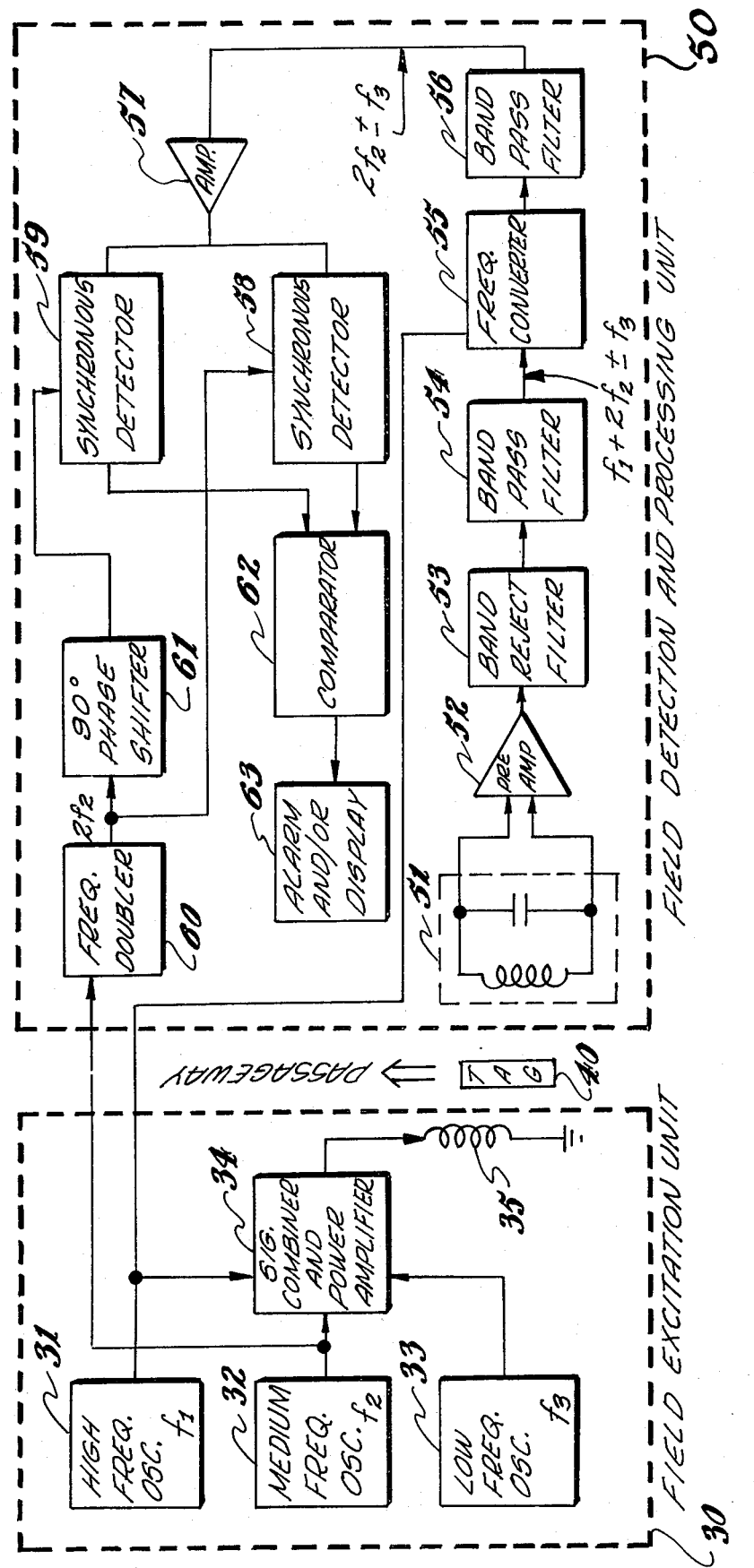
FIG. 1 is a detailed block diagram of the apparatus for generating and for sensing of electromagnetic fields according to the preferred embodiment.
Figure 4:
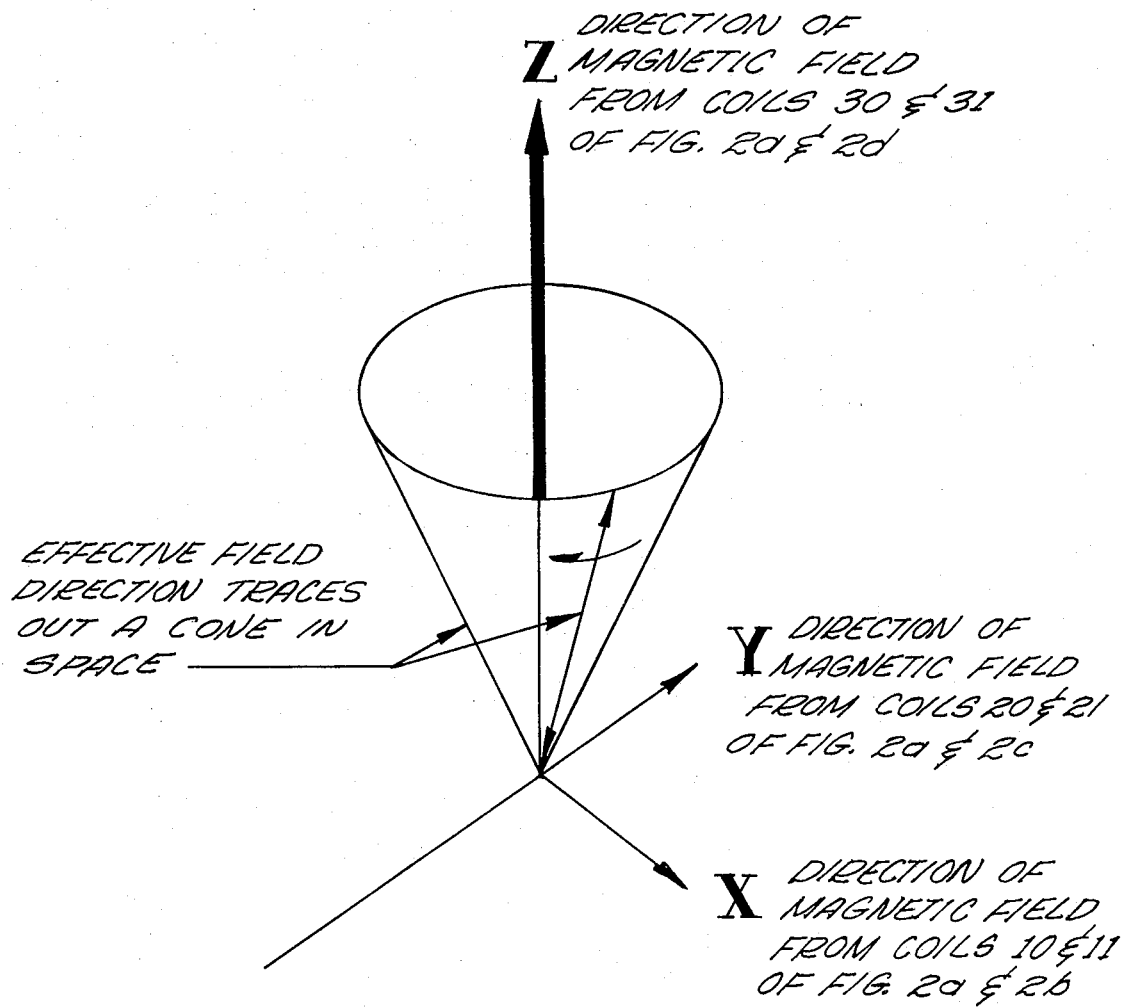
FIG. 4 shows a representation of the net spatial time variation of the effective field direction produced by the three coil sets of FIG. 2 carrying the current waveforms of FIG. 3.

Referring now to FIG. 1, a schematic block diagram of apparatus for generating and detecting electromagnetic fields of the present invention is shown according to the preferred embodiment. The apparatus includes three sections, a field excitation unit 30, a marker tag 40, and a field detection and signal processing unit 50.

The field excitation unit 30 is comprised of oscillators 31, 32, and 33. The signals produced by these oscillators may have audio or lower frequencies. Oscillator 31 produces the basic interrogation signal of frequency $f_1$. Oscillator 32 produces a signal of frequency $f_2$ used for generating the electromagnetic field cyclically biasing the tag material through regions of nonlinearity. Oscillator 33 produces a signal of frequency $f_3$ which is used to control the rate of rotation of the spatial orientation of the generated field. The signals from these three sources are applied to the signal combiner and power amplifier 34. The function of unit 34 is to combine the three signals as delivered by oscillators 31, 32, and 33 to produce the current waveforms illustrated in FIG. 3. The output signal from unit 34 is applied to a field generating unit 35. In the preferred embodiment, field generating unit 35 is comprised of three sets of coils producing three generally spatially orthogonal fields.

Referring next to FIG. 2, the disposition of field-producing coils is shown. FIGS. 2a and 2b show a pair of coils 10 and 11, one coil situated on each side of a passageway, which are electrically interconnected so that the fields produced by these coils generally are additive in the passageway. In addition, the magnetic fields produced in the passageway by coils 10 and 11 are predominantly in spatial direction denoted by X in FIG. 2a.

FIGS. 2a and 2c show a pair of coils 20 and 21, one coil situated on each side of the passageway which are electrically interconnected so that the fields produced by these coils are generally additive in the passageway. In addition, the magnetic fields produced in the passageway by coils 20 and 21 are predominantly in the spatial direction denoted by Y in FIG. 2a.

FIGS. 2a and 2d show a pair of coils 30 and 31, one coil situated on each side of the passageway, which are electrically interconnected so that fields produced by these coils are generally additive in the passageway. In addition, the magnetic fields produced in the passageway by coils 30 and 31 are predominantly in the spatial direction denoted by Z in FIG. 2a.

Referring next to FIG. 3, the signals applied to the field producing coils are shown. FIG. 3a shows the interrogation signal having frequency $f_1$, which is the highest frequency. FIG. 3b shows the biasing signal having frequency $f_2$ which is between $f_1$ and $f_3$. FIG. 3c shows the signal that results from adding the signals of frequency $f_1$ and $f_2$. Note that this is an adding and not a modulating combination of these signals. The use of the output of oscillator 33 having frequency $f_3$, which is the lowest frequency, will be described in detail subsequently.

A marker tag, as well as a variety of other materials, produces a perturbation or disturbance in the electromagnetic field produced by the field excitation unit of the theft detection system. The perturbation in the field is detected by the field detection unit of the theft detection system. The magnetic characteristics of the marker tag are selected to be readily distinguishable from other common field disturbing materials, even when moderate amounts of these other materials co-exist with a marker tag.

A sinusoidal magnetic field of frequency $f_2$ and sufficient amplitude cyclically drives the marker tag into regions of nonlinearity, thus yielding differing response to a smaller amplitude higher frequency interrogation magnetic field at frequency $f_1$. Because of the differing response of the marker tag to the signal of frequency $f_1$, caused by the field of frequency $f_2$, the tag produces among other signals with sum and difference frequency components at side frequencies of $f_1$ a new frequency field component at a frequency of $f_1 + 2f_2$, a side frequency of $f_1$. In the preferred embodiment, the magnetic field at frequency $f_2$ alternately transfers the tag material into a state of magnetic saturation during a portion of each half-cycle of the sine wave. The response of the marker tag to the interrogation field at frequency $f_1$ differs depending on whether the marker tag is in a state of magnetic saturation or in an intermediate magnetic state. As will be clear to those skilled in the art, a complete cycle of the marker tag magnetic state in response to a generally sinusoidal field of sufficient magnitude will include two transits through the intermediate magnetic state.

The apparatus of the preferred embodiment detects and processes the particular new field component at the frequency $f_1 + 2f_2$, a side frequency of $f_1$, and utilizes the unique amplitude and phase produced by the marker tag at this side frequency. The new field at the frequency of $f_1 + 2f_2$, produced by the interaction of the field generated by the unit 35 and marker tag 40 can be detected by the tuned field-reception unit 51 of the field detection and signal processing unit 50. Marker tag 40 is generally constrained to move through the passageway bounded by the field generating coils 35 and the tuned-reception unit 51.

In the preferred embodiment, the marker tag has a long thin geometry. The long thin geometry allows the use of minimum amplitude fields for driving the tag into regions of nonlinearity as long as the applied fields are approximately co-linear with the long axis of the tag. Thus, it is desirable that the applied fields be spatially directed as nearly parallel as possible to the long axis of the tag in order to maximize the magnetic coupling thereto and control the magnetic state of the marker tag.

The magnitudes and phases of the signals applied to the three sets of coils shown in FIG. 2 are controlled so that a scanning type rotation action of the resultant magnetic field is provided. This rotation allows the effective field direction of the applied fields to attain close enough parallelism with all possible tag orientation no less than once every $1/f_3$ seconds. The frequency of rotation, $f_3$, is chosen so that all required spatial field orientations are scanned at least once while a person is in the passageway.

FIG. 3d shows a sinusoidal signal having a frequency of $f_3$. Signal combiner and power amplifier 34 (see FIG. 1) amplitude modulates the added $f_1$ and $f_2$ signals (see FIG. 3c) by the $f_3$ signal to produce a signal having the waveform shown in FIG. 3e. For clarity of the drawing, the $f_1$ component is omitted and only the $f_2$ component is shown within the $f_3$ modulation envelope of FIG. 3e. It will be understood by those skilled in the art, however, that the $f_1$ component is also modulated by the $f_3$ signal and therefore driven through the same amplitude and phase variations as the $f_2$ component that is shown.

Signal combiner and power amplifier 34 also includes a phase shifter which phase shifts the $f_3$ signal 90°. This 90° phase shifted $f_3$ signal is also used to amplitude modulate the added $f_1$ and $f_2$ signal of FIG. 3c, resulting in a signal having the waveform shown in FIG. 3f. Again, the $f_1$ component is omitted for clarity. This, of course, is the same as the waveform of FIG. 3e except that the envelope is time phase-shifted 90°.

For clarity of understanding, the added $f_1$ and $f_2$ signal of FIG. 3c is illustrated in FIG. 3g. As in FIGS. 3e and 3f, the $f_1$ component is omitted for the sake of clarity to more distinctly illustrate the phase relationships between the signals shown in FIGS. 3e, 3f, and 3g.

Each of the three signals shown in FIGS. 3e, 3f, and 3g is applied to one of the three pairs of orthogonal field producing coils shown in FIG. 2. In the preferred embodiment, the signal of FIG. 3e is applied to coils 10 and 11, causing magnetic field components in the X direction; the signal of FIG. 3f is applied to coils 20 and 21, causing magnetic field components in the Y direction; and the signal of FIG. 3g is applied to coils 30 and 31, causing magnetic field components in the Z direction.

It will be understood by those skilled in the art that the resulting effective magnetic field in the passageway sweeps out a conical surface about the Z axis, rotating at a frequency of $f_3$. By adjusting the relative amplitudes of the three signals applied to the coils, the slope of the conical surface may be varied and its cross-section made circular or elliptical. In the preferred embodiment, the relative amplitudes are selected to provide an approximately right circular cone having a slope of approximately 45°.

The resulting field in the passageway is then comprised of two parts. The first part, the applied field, has frequency components of $f_1-f_3, f_1, f_1+f_3, f_2-f_3, f_2,$ and $f_2+f_3$. The second part, that resulting from the interaction of the applied field with the nonlinear tag material, has a multitude of frequencies comprising all sums and differences of the frequencies and harmonics thereof contained in the applied field. The preferred embodiment utilizes the following three frequencies: $f_1 + 2f_2 - f_3, f_1 + 2f_2,$ and $f_1 + 2f_2 + f_3$.

Field detecting and signal processing unit 50, which includes field reception unit 51, includes apparatus for processing signals detected by unit 51. The signal produced by field reception unit 51 is applied to amplifier 52, which is tuned to pass frequencies from $f_1 + 2f_2 - f_3$ to $f_1 + 2f_2 + f_3$. The output signal of amplifier 52 is passed through a band reject filter 53 further attenuating any $f_1$ frequency component and then passed through a bandpass filter 54 to preserve only those frequencies from $f_1 + 2f_2 - f_3$ to $f_1 + 2f_2 + f_3$. The signal from filter 54 is then applied to frequency converter unit 55.

Unit 55 utilizes a reference signal from oscillator 31 to produce an output signal at the frequency of $2f_2 - f_3$, $2f_2$, and $2f_2 + f_3$ assuming input frequencies of $f_1 + 2f_2 - f_3, f_1 + 2f_2$ and $f_1 + 2f_2 + f_3$. The bandpass filter 56 acts to eliminate any undesired output frequency components produced by the frequency converter 55 and passes only frequencies within a bandwidth of $2f_3$ centered about the frequency $2f_2$.

The output of the bandpass filter 56 is coupled to the input of amplifier 57. An output signal of amplifier 57 is applied to synchronous detectors 58 and 59. Synchronous detector 58 has applied thereto a reference signal of frequency $2f_2$ generated by frequency doubler 60. Frequency doubler 60 receives its input signal from oscillator 32. The output signal of unit 58 is a combined signal with dc and $f_3$ frequency components. The output signal of unit 58 is a function of the phase of the signal supplied to unit 58 by amplifier 57.

The output signal of frequency doubler 60 is also applied to a 90° phase shift circuit 61 to produce a second reference signal at frequency $2f_2$, but with a 90° phase shift, from the reference signal applied to unit 58. The signal from unit 61 is applied to synchronous detector 59. The output signal of unit 59 is also a combined signal with dc and $f_3$ frequency components and is a function of the phase of the signal supplied to unit 59 by amplifier 57.

The output signals of the synchronous detectors 58 and 59 are both applied to amplitude comparator 62. The comparator 62 applies a signal to alarm-display unit 63 when the two inputs to unit 62 have predetermined characteristics indicating the presence of a marker tag located in a passageway, i.e., a location determined by the coils of excitation unit 30 and the reception unit 51.

In the preferred embodiment, an alarm signal from unit 63 is produced when the amplitude of the output from synchronous detector 59 exceeds the amplitude of the output from synchronous detector 58 by a preestablished threshold amount. Typically, the presence of a marker tag in the passageway will produce a substantially larger output from unit 59 than from unit 58, while the presence of common ferrous objects in the passageway produce larger outputs from unit 58 than from unit 59.

Since the marker tag can produce side frequency components of $f_1$ in addition to the $f_1 + 2f_2$ components utilized in the preferred embodiment, these other side frequency components can likewise be utilized in a manner similar to that described above for the generated $f_1 + 2f_2$ components, to establish the presence of a marker tag in the passageway. Also, the resultant field may be made to rotate about the X or Y axis as well as the Z axis, if desired.

The above description is included to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A detection system for detecting a presence of at least one of a plurality of objects at a preestablished location comprising: a plurality of marker tags, at least one marker tag coupled to each of said plurality of objects, each of said marker tags having a field controllable property; means for generating a field at said preestablished location, said field establishing a state of said field controllable property of said tag; and means for detecting the presence of said tag in the said preestablished location by monitoring an effect the said state of the said tag has on the total field in the said location, said means for detecting being capable of processing a signal that is a combination of frequencies dependent upon the state of said field controllable property, said field being composed of at least two different frequencies, a first frequency and a second frequency, each having amplitudes in the order of that necessary to cause said tag to move through said states of said field controllable property which can change said total field in the vicinity of said tag, and said net field of said at least two different frequencies being amplitude modulated by another third frequency in such a manner as to create a spinning field so that said tag can be detected within the preestablished location regardless of orientation of said tag while it is within the spinning field.

2. The fields of detection system of claim 1 wherein the said field is produced by either applying signals of the said frequencies to individual transducers or first adding the signals of said frequencies prior to applying the said signals to common transducers.

3. A means for detecting the presence of said tag of detection system of claim 1 wherein the said field change in the vicinity of the tag is detected in the said preestablished location by the detection system.

4. A theft detection system, wherein a marker tag is associated with an object and said marker tag including a material with preselected properties producing detectable perturbations in a magnetic field at a preestablished location, apparatus for providing said magnetic field at said preestablished location comprising:

means for generating a sinusoidal first signal of a first frequency;

means for generating a sinusoidal second signal of a second frequency wherein said second frequency is higher than said first frequency;

means for adding said first and said second signals to provide a combined, Z, signal;

means for generating a Z magnetic field at said preestablished location from said Z signal, wherein a component of said Z field having said first frequency causes a change in the state of said preselected properties of said marker tag, wherein said changes are probed by the component of said Z field having said second frequency producing a component from said field containing a frequency, among a plurality of frequencies, at the said second frequency plus twice the said first frequency;

means for generating a sinusoidal third signal of a third frequency wherein said third frequency is lower than said first frequency;

means for multiplying the said first signal by the said third signal producing a fourth signal containing two equal amplitude signals of frequencies of the said first frequency plus the said third frequency and of the said first frequency minus the said third frequency;

means for multiplying the said second signal by the said third signal producing a fifth signal containing two equal amplitude signals of frequencies of the said second frequency plus the said third frequency and of the said second frequency minus the said third frequency;

means for adding the said fourth and said fifth signals to provide a combined, Y, signal;

means for generating a Y magnetic field at said preestablished location from said Y signal, wherein a component of said Y field having said fourth signal frequencies causes a change in the state of said preselected properties of said marker tag wherein said changes are probed by the component of said Y field having said fifth signal frequencies producing a component from said field containing two frequencies, among a plurality of frequencies, at the said second frequency plus twice the said first frequency plus the said third frequency and at the said second frequency plus twice the said first frequency minus the said third frequency;

means for generating a phase shifted third signal by phase shifting the said third signal by 90°;

means for multiplying the said first signal by the said phase shifted third signal producing a sixth signal containing two equal amplitude signals of frequencies of the said first frequency plus the said third frequency and of the said first frequency minus the said third frequency;

means for multiplying the said second signal by the said phase shifted third signal producing a seventh signal containing two equal amplitude signals of frequencies of the said second frequency plus the said third frequency and of the said second frequency minus the said third frequency;

means for adding the said sixth and said seventh signals to provide a combined, X, signal;

means for generating an X magnetic field at said preestablished location from said X signal, wherein a component of said X field having said sixth signal frequencies causes a change in the state of said preselected properties of said marker tag wherein said changes are probed by the component of said X field having said seventh signal frequencies producing a component from said field containing two frequencies, among a plurality of frequencies, at the said second frequency plus twice the said first frequency plus the said third frequency and at the said second frequency plus twice the said first frequency minus the said third frequency.

5. The applied magnetic field of the theft detection system of claim 4 further includes means for generating a said applied magnetic field in the preestablished location with an effective field detection which changes with time at a rate of twice the frequency of a said third frequency, wherein there is provided:

means for generating the said first signal of a low audio frequency, the said second signal of a high audio frequency, and the said third signal of a subaudio frequency;

means for properly combining the three signals, said first signal, said second signal, and said third signal, wherein the same combined X signal, said combined Y signal, and said combined Z signal are generated; and apparatus for coupling said combined X signal to a pair of coils, said combined Y signal to another pair of coils, and said combined Z signal to yet another pair of coils;

apparatus for generating the three said applied magnetic fields, said X magnetic field, said Y magnetic field, and said Z magnetic field, wherein each of the three said magnetic fields is substantially spatially orthogonal to each other within the said preestablished location by positioning each member of each said pair on opposite sides of the said preestablished location and by electrically interconnecting the two members of each said pair to their respective said apparatus for coupling the respective said combined signals to the said coil pairs.

6. A system for detecting a marker tag in a preestablished location, wherein said marker tag includes an easily saturable magnetic material, the marker tag having preselected properties producing detectable perturbations in a magnetic field containing an X magnetic field, a Y magnetic field, and a Z magnetic field, apparatus for detecting the presence of the said marker tag by detecting said detectable perturbations in said magnetic field at said preestablished location, comprising: means for generating an applied magnetic field at said preestablished location the magnetic field including the X, Y, and Z magnetic fields, said applied magnetic field resulting in said marker tag periodically alternating through a state of minimum magnetic response and the opposite state of maximum magnetic field response; means for detecting the presence of said marker tag by detecting the resulting magnetic field perturbations in the vicinity of the said tag at said preestablished location resulting from said periodic magnetic response or state of the said marker tag; means for producing electrical signals from the said detectable perturbations in the said magnetic field wherein the said electrical signal contains three frequencies, among a plurality of frequencies, a second frequency plus twice a first frequency, said second frequency plus twice the said first frequency plus a third frequency, and said second frequency plus twice the said first frequency minus the said third frequency, wherein the said first frequency is caused by the interaction of the said marker tag and the said Z magnetic field and the latter two frequencies are caused by the interaction of the said marker tag and said X magnetic field or said Y magnetic field or both said X magnetic field and said Y magnetic field; means for selecting the said three frequencies from a said plurality of frequencies by a technique known, to one versed in the art of electronic signal processing, as filtering; apparatus coupled to source of said second signal for producing from said electrical signal of said three frequencies a signal of the following three frequencies, twice the said first frequency, twice the said first frequency plus the said third frequency, and twice the said first frequency minus the said third frequency; apparatus coupled to source of said first signal for producing, from an input of said remaining electrical signal, a signal having the frequencies of zero and said third frequency wherein the amplitudes of the signals of the two frequencies are proportional to the said input amplitude and phase shift of said input relative to the said first signal; means for phase shifting said first signal by 90° and apparatus coupled to source of said phase shifted signal for producing from said input of said remaining electrical signal, a signal having the frequencies of zero and said third frequency wherein the amplitudes of the signals of the two frequencies are proportional to the said input amplitude and phase shift if said input relative to the said phase shifted first signal; and means for comparing the signal amplitudes produced by said apparatus coupled to the said first signal to the signal amplitude produced by said apparatus coupled to the said phase shifted first signal and for producing a two-level output wherein a positive output reveals the presence of a said marker tag in the said preestablished location and a negative output reveals the absence of a said marker tag in the said preestablished location.

7. A system capable of detecting a preselected marker tag within a predetermined area comprising: a first signal generator producing a first signal; a second signal generator producing a second signal lower in frequency than the first signal; a third signal generator producing a third signal lower in frequency than the second signal; a plurality of coils; means to combine the first, second, and third signals so that various combinations of the signals can be provided to the plurality of coils, the plurality of coils producing a varying signal pattern within the predetermined area; a reception unit to receive any perturbations that may occur in the varying signal portion; means to select a predetermined frequency output from the reception unit, the predetermined frequency being a sideband which results from a mixing process occurring in the preselected marker tag upon exposure to combined first, second, and third signals; and indicating means to produce an indication that the preselected marker tag is present within the predetermined area.

8. The system of claim 7 wherein the predetermined frequency selected from the reception unit output is equal to twice the frequency of the second signal plus or minus the frequency of the third signal.

9. A system capable of detecting a preselected marker tag within a predetermined area comprising: a plurality of signal generators each generating a signal of a different frequency; means to combine the signals of different frequency and to phase shift at least one signal with respect to another signal; a plurality of coils positioned around the predetermined area, the plurality of coils producing a field within the predetermined area when excited by signals out of the means to combine, the field being a spinning field caused by the phase shifted signal; a reception unit to receive any perturbations that may be present within the predetermined area; means to extract a predetermined frequency component of the perturbations within the predetermined area from the reception unit; and means to detect and trigger an alarm when the perturbations are caused by the preselected marker tag, thereby producing an indication whenever the preselected marker tag is present within the predetermined area.

10. The system of claim 9 wherein the field produced by the plurality of coils is composed of three mutually non-parallel magnetic fields.

11. The system of claim 9 wherein the predetermined frequency component extracted from the reception unit is equal to twice a frequency of one of the generated signals plus or minus a frequency of another of the generated signals.

12. The system of claim 9 wherein the means to detect and trigger an alarm includes means for detecting the predetermined frequency component with respect to one signal from the plurality of signal generators to produce a first detected signal and means for detecting the predetermined frequency component with respect to the one signal phased shifted a predetermined amount to produce a second detected signal, a comparator to compare the first and second detected signals to determine whether any perturbations were caused by the preselected marker tag.

* * * * *